United States Patent [19]

Okuno et al.

[11] 4,286,935
[45] Sep. 1, 1981

[54] EARTH AND SAND CONVEYOR SYSTEM

[75] Inventors: Noboru Okuno, Hiratsuka; Takashi Takeuchi, Oiso; Akihiko Tsuzuku, Hiratsuka; Masao Tanazawa, Tokyo; Minoru Nakajima, Isehara; Haruo Imamura, Fujisawa, all of Japan

[73] Assignee: Kabushiki Kaisha Komatsu Seisakusho, Tokyo, Japan

[21] Appl. No.: 92,482

[22] Filed: Nov. 8, 1979

[51] Int. Cl.³ .............................................. B65G 53/04
[52] U.S. Cl. ..................................... 425/72 R; 83/53; 83/99; 83/177; 264/500; 264/148; 264/335; 406/50; 406/56; 425/94; 425/97; 425/308; 425/315; 425/377; 425/404; 425/437
[58] Field of Search .............. 425/72 R, 94, 308, 315, 425/342.1, 377, 404, 387.1, 437, 106, 107, 97; 406/50, 56; 83/53, 99, 177; 264/500, 504, 148, 335, DIG. 39

[56] References Cited

U.S. PATENT DOCUMENTS

| 1,442,764 | 1/1923 | Fox | 264/148 |
| 1,506,036 | 8/1924 | Willmarth | 425/308 |
| 1,751,624 | 3/1930 | Du Brul | 264/504 |
| 2,365,374 | 12/1944 | Bailey | 264/148 |
| 2,729,947 | 1/1956 | Cheney | 425/377 |
| 3,746,256 | 7/1973 | Hall et al. | 83/53 |
| 4,094,551 | 6/1978 | Flain et al. | 406/56 |

FOREIGN PATENT DOCUMENTS 52-115537 9/1977 Japan.
52-125832 9/1977 Japan.
53-26403 3/1978 Japan.

Primary Examiner—Jeffery R. Thurlow
Attorney, Agent, or Firm—Armstrong, Nikaido, Marmelstein & Kubovcik

[57] ABSTRACT

An earth and sand conveyor system comprising a hopper adapted to receive dumped earth and sand, a trough connected to the hopper, a screw conveyor rotatably mounted within the hopper and the trough, a consolidating pipe connected to the trough, a molding pipe connected to the consolidating pipe, a conveyor pipe connected to the molding pipe, a first nozzle formed in the wall of the molding pipe, a second nozzle formed in the wall of the conveyor pipe, an air compressor connected to the first and second nozzles, and a directional control valve disposed between the air compressor and the first and second nozzles for alternately supplying the compressed air to the first and second nozzles.

3 Claims, 3 Drawing Figures

EARTH AND SAND CONVEYOR SYSTEM

BACKGROUND OF THE INVENTION

This invention relates to an earth and sand conveyor system.

In civil engineering works, for conveying earth and sand laterally there have been used belt conveyors, trucks and the like while grab buckets are used for transporting earth and sand vertically. In these earth and sand conveying means, however, there have been involved public nuisances such as air pollution due to generated dust, noise pollusion, etc.

There has been proposed another type of earth and sand conveying or transporting system in which a screw conveyor is employed for conveying earth and sand which are supplied from a hopper, the earth and sand are then consolidated in a tapered pipe before entering into conveyor pipes. In the above system, however, since the earth and sand supplied from the hopper are consolidated in the tapered pipe, a great deal of loads are imposed on the screw conveyor for conveying the consolidated earth and sand through conveyor pipes. To meet the loads imposed on the screw conveyor, a drive means for the screw conveyor with a massive power is required which, however, is very difficult to attain in practical applications.

SUMMARY OF THE INVENTION

It is therefore an object of the present invention to provide an earth and sand conveyor system which is capable of conveying earth and sand efficiently without causing any public nuisances such as air pollution, noise pollution, etc.

Another object of the present invention is to provide an earth and sand conveyor system wherein consolidated and plugged earth and sand are conveyed through conveyor pipes smoothly with lubricating liquid being supplied thereto thereby reducing the friction between the conveyor pipes and the plugged earth and sand to be conveyed.

In accordance with an aspect of the present invention, there is provided an earth and sand conveyor system, comprising: a hopper adapted to receive dumped earth and sand, trough means connected to said hopper, a tapered pipe connected to said trough means, screw conveyor means rotatably mounted within said hopper and said trough means, drive means for rotating said screw conveyor means, molding pipe means for molding the earth and sand supplied from said tapered pipe into a predetermined shape while passing therethrough, said molding pipe means having a diameter $d_1$ and being connected to said tapered pipe, conveyor pipe means connected to said molding pipe means and adapted for conveying the earth and sand therethrough, first nozzle means formed in the wall of said molding pipe means, second nozzle means formed in the wall of said conveyor pipe means, air compressor means connected to said first and second nozzle means for supplying a compressed air thereto, and directional control valve means disposed between said air compressor means and said first and second nozzle means for alternately supplying the compressed air to said first and second nozzle means.

The above and other objects, features and advantages of the present invention will be readily apparent from the following description taken in conjunction with the accompanying drawings.

DETAILED DESCRIPTION OF THE INVENTION

Figure 1:
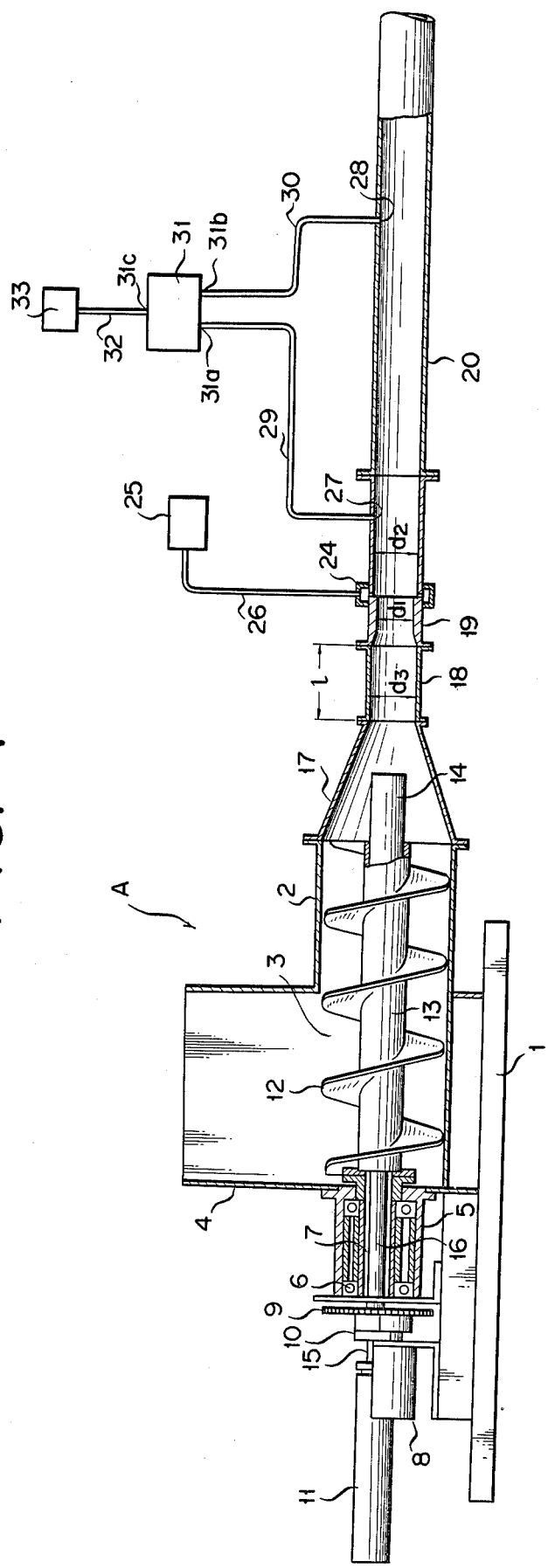
FIG. 1 is a longitudinal sectional view of an earth and sand conveyor system according to the present invention.

The present invention will now be described with reference to the accompanying drawings. In FIG. 1, reference character "A" denotes an earth and sand supplying apparatus mounted on a base 1. The earth and sand supplying apparatus "A" includes a trough 2 having an opening 3 formed in the upper part thereof. The trough 2 has a hopper 4 which leads to the opening 3.

Fixedly secured to the trough 2 is a shaft bearing member 5, the front end of which is connected to the rear end of the trough 2.

A hollow shaft 7 is supported in the shaft bearing member 5 through a bearing 6. The hollow shaft 7 is connected through a gear train 9 to the output side of a hydraulic motor 8.

Fixedly secured to the base 1 is a bracket 10 which in turn is fixedly secured to a cylinder 11. Mounted within the above-mentioned trough 2 is a screw conveyor 12 having a hollow screw shaft 13, the rear end of which is connected to the aforementioned hollow shaft 7.

A piston 14 is slidably mounted within the above-mentioned screw shaft 13. The above-mentioned cylinder 11 includes a connecting rod 15 which is connected through a connecting rod 16 to the piston 14.

Connected to the front end portion of the above-mentioned trough 2 is a tapered pipe 17 which is connected through a consolidation pipe 18 to a molding pipe 19. The molding pipe 19 is connected to a conveyor or transporting pipe 20.

Figure 2:
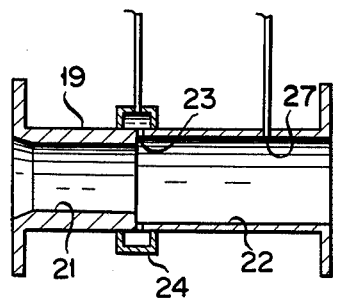
FIG. 2 is an enlarged sectional view of a molding pipe.
Figure 3:
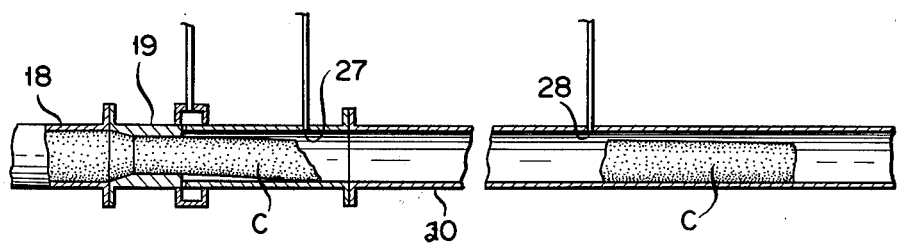
FIG. 3 is a longitudinal sectional view of a molding pipe and a conveyor pipe showing how the plugged earth and sand is to be cut and conveyed.

As shown in FIG. 2, the molding pipe 19 comprises a molding portion 21 and a lubricating portion 22, and a plurality of lubricating nozzles 23 are formed circumferentially in the wall of the lubricating portion 22 immediately adjacent to the molding portion 21. Formed in the outer periphery of the molding pipe 19 is an annular chamber 24 surrounding the nozzles 23. The chamber 24 is connected to the delivery side of a lubricating oil pump 25 by means of a conduit 26.

The lubricating portion 22 of the molding pipe 19 and the transporting pipe 20 have nozzles 27 and 28, respectively. The nozzles 27 and 28 are connected through conduits 29 and 30 to outlet ports 31a and 31b, respectively of a directional control valve 31 which has an inlet port 31c connected to a compressor 33 through a conduit 32.

There is a following relationship between the inside diameter of the consolidating pipe 18 and those of the molding portion 21 of the molding pipe 19, the lubricating portion 22 and the transporting or conveyor pipe 20.

$$d_1 < d_2 \leq d_3$$

Where the inside diameter of the consolidating pipe 18 is $d_3$, that of the molding portion 21 is $d_1$, and those of the lubricating portion 22 and the transporting pipe 20 are $d_2$. The difference between $d_1$ and $d_2$ or $(d_2-d_1)$ is only several millimeters.

The operation of the device according to the present invention will now be described below.

By driving the hydraulic motor 8, the screw conveyor is rotated through the gear train 9 and the hollow shaft 7. The earth and sand put into the hopper 4 is conveyed towards the tapered pipe 17 by the rotation of the screw conveyor 12. The actuation of the cylinder 11 causes the piston 14 to be moved forward thereby forcing the earth and sand into the consolidating pipe 18. After having passed through a suitable length I as shown, the earth and sand is allowed to pass through the molding portion 21 so that it may be molded into an earth and sand plug C having a sufficient density. Because of the aforementioned relationship $d_1 < d_2 \leq d_3$, the possibility of clogging of the lubricating nozzles 23 can be eliminated, and the lubricating oil ejected through the nozzles 23 ensures a complete lubrication to be made in the periphery of the earth and sand plug C.

When the earth and sand plug C having a predetermined length has thus been formed, the directional control valve 31 is rendered operative to supply compressed air to the nozzle 27 thereby cutting the earth and sand plug C. Thereafter, the earth and sand plug C is moved by the compressed air supplied through the nozzles 27, the supply of which is cut off after the earth and sand plug C has passed through the compressed air supply nozzle 28. Then, the earth and sand plug C will be conveyed in the transporting pipe 20 by the action of the compressed air supplied through the nozzle 28. At that time, another earth and sand plug C which is yet to be cut is supplied, and when it has been formed to have a predetermined length, it is cut by the action of the compressed air from the nozzles 27, and at the same time the supply of compressed air through the compressed air supply nozzle 28 is cut off by the actuation of the directional control valve 31. After passing through the compressed air supply nozzle 28, the earth and sand plug C which has thus been cut is transported in the transportation pipe 20 by changing-over the directional control valve 31.

The earth and sand will be transported by repeating the above-mentioned process.

The conveyor device of the present invention is applicable to the transportation of all types of soils excluding pebbles and gravels, and in particular, ordinary soils, soils with high moisture content, sand and soils containing sand. The seal of the compressed air during the transportation is achieved by the consolidated earth and sand compacted in the consolidating pipe 18 and the material seal formed around the screw conveyor 12.

Ordinary soils, when they are subject to consolidated molding and lubrication, can be conveyed readily under a pressure which is extremely lower than that in the case when either they are not molded or lubricated.

Whilst, in case of soils with high moisture content, sand or soils containing sand, depending on the particle-size distribution and the moisture content of the soils, the formation of the plug having a diameter of $d_1$ is not sometimes obtained with the plug's diameter expanding to the inside diameter of the transporting pipe 20. However, complete molding and lubrication by means of the consolidating pipe 18 and the molding pipe 19 ensures smooth transportation of such soils at a low pressure because of their fluidity.

Further, it is needless to say that the lubrication is unnecessary for sand with high moisture content and soils with high moisture content in which the moisture thereof soaks through the surface when they are subjected to consolidation. Further, the consolidation process can be omitted for soils having a considerable viscosity and which can be easily molded by consolidation.

It is to be understood that the foregoing description is merely illustrative of a preferred embodiment of the invention, and that the scope of the invention is not to be limited thereto, but is to be determined by the scope of the appended claims.

What we claim is:

1. In an earth and sand conveyor system including a hopper adapted to receive dumped earth and sand, trough means connected to said hopper, a tapered pipe connected to said trough means, screw conveyor means rotatably mounted within said hopper and said trough means, and drive means for rotating said screw conveyor means, the improvement comprising:

consolidating pipe means for consolidating the earth and sand supplied from said tapered pipe, said consolidating pipe means having an inner diameter $d_3$ and being connected to said tapered pipe;

molding pipe means for molding the earth and sand supplied from said consolidating pipe means into a predetermined shape while passing therethrough, said molding pipe means having a molding pipe section with an inner diameter $d_1$ and a lubricating pipe section with an inner diameter $d_2$ and being connected to said consolidating pipe means;

conveyor pipe means connected to said molding pipe means and adapted for conveying the earth and said therethrough, said conveyor pipe means having the inner diameter $d_2$ wherein the $d_1$, $d_2$, and $d_3$ are set by a formula $d_1 < d_2 \leq d_3$;

a plurality of first nozzle means for injecting a lubricant to lubricate the molded earth and sand formed circumferrentially in the wall of the lubricating pipe section immediately adjacent to the molding pipe section;

pump means for supplying a lubricant to said first nozzle means;

second nozzle means formed in the wall of the lubricating pipe section of said molding pipe means for injecting compressed fluid into said molding pipe means to cut the molded earth and sand and form a molded earth and sand plug therefrom, said second nozzle means being downstream of said plurality of said first nozzle means;

third nozzle means formed in the wall of said conveyor pipe means and spaced from said second nozzle means for injecting a compressed fluid into said conveyor pipe means to push the molded earth and sand on the cut surface thereof, thereby moving said molded earth and sand plug through said conveyor pipe means;

compressor means connected to said second and third nozzle means for supplying the compressed fluid thereto; and directional control valve means disposed between said compressor means and said second and third nozzle means for alternately supplying the compressed fluid to said second and third nozzle means.

2. An earth and sand conveyor system as set forth in claim 1 further comprising a piston slidably mounted within a hollow screw shaft of the screw conveyor, and hydraulic cylinder means for actuating said piston.

3. An earth and sand conveyor system as set forth in claim 1 further comprising an annular chamber formed on said molding pipe means encircling said first nozzle means for lubricant.

* * * * *